Dec. 7, 1943.  L. G. OREN  2,335,878
TIRE VULCANIZING MACHINE
Filed March 11, 1938  2 Sheets-Sheet 1
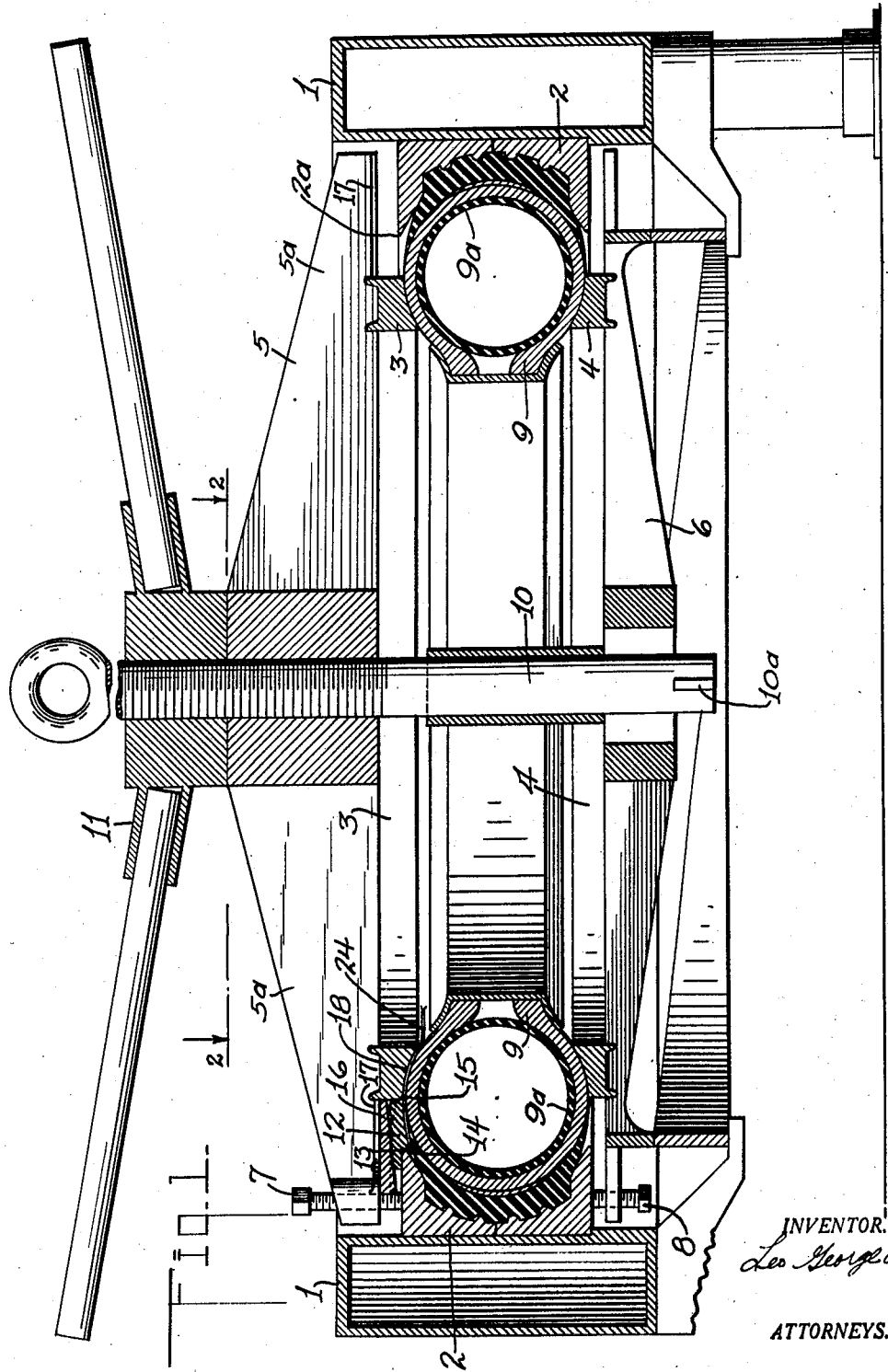
INVENTOR.
Leo George Oren
ATTORNEYS.

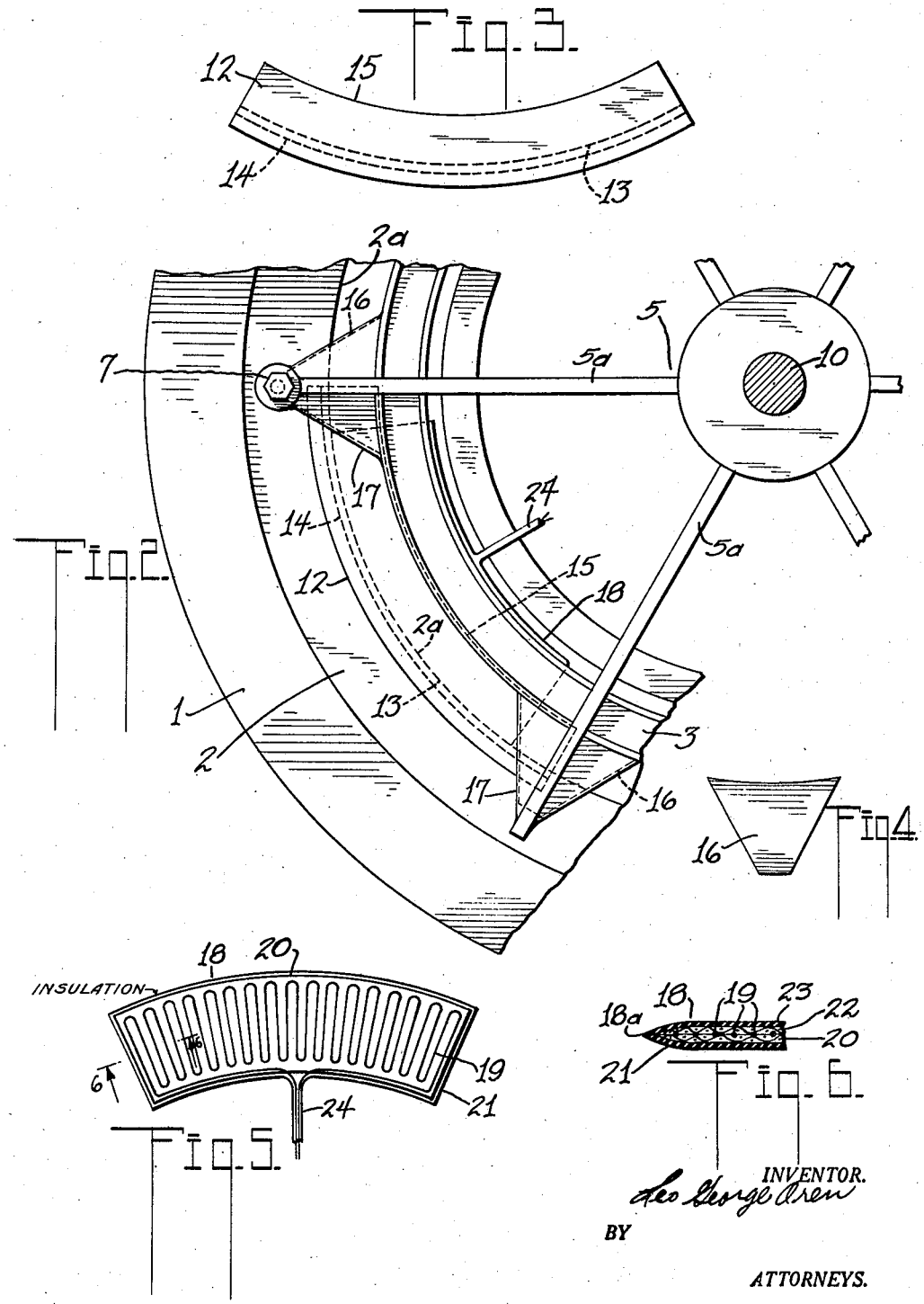

Patented Dec. 7, 1943

2,335,878

UNITED STATES PATENT OFFICE 2,335,878

TIRE VULCANIZING MACHINE

Leo George Oren, Oakland, Calif.

Application March 11, 1938, Serial No. 195,325

6 Claims. (Cl. 18—18)

My invention relates to improvements in a tire vulcanizing machine, and it consists of the combinations, constructions and arrangements hereinafter described and claimed.

In the standard tire recapping machine, the annular pressure plates are spaced varying distances from the tire capping matrix according to the size of the tire being capped and the size of the matrix used. Frequently the side wall of a worn tire has become damaged and this must be fixed when the tire is recapped. Under the present method, it is necessary to first recap the tire and then afterward patch the broken portion of the side wall and place the tire in a special vulcanizing machine for vulcanizing the patch to the tire side wall. This procedure not only requires additional time for curing the patch in the side wall, but it also requires a separate vulcanizing machine other than the tire capping mold.

The principal object of my invention is to provide an auxiliary pressure plate that may be placed in a tire capping mold between the annular pressure plate and the matrix enclosing the tread. The auxiliary pressure plate is positioned over the patched portion of the tire side wall and a heating pad of a particular construction is placed under both the auxiliary pressure plate and the annular pressure plate and over the tire wall. The heat from the pad will vulcanize the patch in the side wall during the same time the recap is being vulcanized to the tire. In this way both the recap and the side wall patch are vulcanized at the same time and in one machine. A saving in time results and the amount of equipment is also reduced to a minimum.

The heating pad used for vulcanizing the side wall patch consists of a predetermined length of electrical resistance wire embedded between one or more layers of asbestos and these are covered by one or more layers of rubber. The edges of the rubber layers are vulcanized together to form an enclosure for the asbestos layers and the resistance wire. The rubber will also be vulcanized to the layers of asbestos. The wire when connected to an A. C. source of current will generate the proper amount of heat for curing the raw rubber in the tire side wall patch.

Other objects and advantages will appear in the following specification, and the novel features of the device will be particularly pointed out in the appended claims.

My invention is illustrated in the accompanying drawings forming a part of this application, in which Figure 1 is a transverse section through a tire capping mold, showing my device operatively applied thereto;

Figure 2 is a section along the line 2—2 of Figure 1, showing a top plan view of a portion of the mold;

Figure 3 is a plan view of an auxiliary pressure plate;

Figure 4 is a plan view of a wedge used with the auxiliary pressure plate;

Figure 5 shows a plan view of a heating pad with the top layers of rubber and asbestos removed in order to show the heating wire; and Figure 6 is an enlarged section taken along the line 6—6 of Figure 5.

In carrying out my invention, I make use of a standard capping mold for tires. The mold has a steam chamber 1, a tire capping matrix 2 formed of two parts, and pressure rings or plates 3 and 4, see Figures 1 and 2. A spider 5 carries the pressure plate 3 and a spider 6 carries the pressure plate 4. Adjustable screws 7 and 8 are carried by certain arms of the spiders 5 and 6 and position the pressure plates 3 and 4 in proper relation to a tire casing 9 that is being recapped. A central screw 10 and a hand wheel 11 are used for forcing the spiders 5 and 6 toward each other so that the pressure plates 3 and 4 will hold the side walls of the tire 9 in proper position.

The parts thus far described, form no part of my invention except insofar as they cooperate with the parts now to be described. The pressure plates 3 and 4 are spaced varying distances away from the matrix 2 according to the size of the matrix being used. The matrix, of course, varies in size according to the size of the tire being recapped. If a break in the tire wall 9 should lie between the pressure plate 3 and the matrix 2, it would be impossible with the present standard equipment, to patch the break and vulcanize the patch to the tire wall at the same time the new tread is being vulcanized to the tire. It would first be necessary to vulcanize the tread to the tire and then after removing the tire from the mold, vulcanize a patch in the tire side wall by placing the tire in another type of mold designed especially for this purpose.

I provide an auxiliary pressure plate and a heating pad to permit a tire wall patch to be vulcanized while the recap is being vulcanized. Figure 3 shows an auxiliary pressure plate 12 and this plate is designed to be placed between adjacent arms 5a of the spider 5, see Figure 2. The plate 12 is arcuate in shape and has a recess or groove 13 with a lip 14 that is designed to engage with an annular edge 2a of the matrix 2. The width of the plate 12 is sufficient to extend across the space between the pressure plate 3 and the matrix 2. The inner edge 15 of the plate 12 has a projection designed to be received under the outer edge of the pressure plate 3. In this way the auxiliary pressure plate 12 will be held in place against the tire wall by the pressure ring 3 and the matrix 2.

The pressure ring 3 may be raised or lowered slightly without freeing the auxiliary pressure plate 12, and the plate 12 will merely fulcrum about the annular edge 2a of the matrix 2. The recess 13 receives the edge 2a and there is sufficient play to permit the fulcruming movement without any binding action. A different sized auxiliary plate will be provided for different sized matrices.

The auxiliary plate 12 is additionally held down upon the tire by wedges 16, see Figure 2. These wedges are triangular in shape as shown in Figure 4, and are placed under triangular-shaped webs 17 that link the pressure ring 3 with the ends of the spider arms 5a. The thickness of the wedges 16 varies according to the spacing of the spider with respect to the matrix 2 and the size of the tire 9 being recapped. The wedges 16 have their narrow ends positioned nearest the pressure plate 3.

The auxiliary plate 12 is used for holding a heating pad 18 over the patch in the tire side wall that is to be vulcanized. Figure 1 shows the pad extending under the pressure ring 3 as well as under the auxiliary plate 12. The construction of the pad is illustrated in Figures 5 and 6. A predetermined length of electrical resistance wire 19 is placed on a layer of asbestos 20 or other suitable material. The layer 20 of asbestos lies on a layer 21 of rubber, see Figure 6. The resistance wire 19 is covered by a second layer of asbestos 22 and a second layer of rubber 23 overlies the asbestos layer 22. The edges of the two layers of rubber 21 and 23 extend beyond the edges of the two layers of asbestos 20 and 22 and are vulcanized together at 18a to form an enclosure for the heating wire 19 and layers of asbestos. The rubber will penetrate through the asbestos and vulcanize all of the parts into a unitary structure. A rubber conduit 24 leads from the pad and carries the wires that connect with a source of current. An electric switch, not shown, may be used for varying the amount of current entering the heating pad 18 and in this way control the heat generated by the pad.

From the foregoing description of the various parts of the device, the operation thereof may be readily understood.

A sufficient number of auxiliary pressure plates 12 of different widths are provided to take care of the various sizes of matrices and to span the distance between the matrix and the pressure plate 3. Wedges 16 of proper thicknesses are also provided for adjusting the angular positions of the auxiliary pressure plates.

The tire to be vulcanized has the rubber placed on its tread and the defect in the side wall is also patched before placing the tire in the capping mold. The tire is now placed in the mold in the usual manner. The top spider 5 is removed and the upper half of the matrix 2 is also removed to receive the tire. After the tire is placed in the lower matrix half, the upper matrix half and the spider 5 are placed in position. The spider 5 is positioned so that two of its arms 5a will now straddle the patch in the tire side wall. It should be noted that the tire is placed in the matrix so that the patched side faces upwardly.

The heating pad 18 is placed over the patch and under the pressure plate 3. The auxiliary plate 12 of the proper size is placed over the pad and the ends of the plate are placed under the ends of the two adjacent arms 5a of the spider. When necessary, wedges 16 of the proper thickness are mounted between the plate 12 and the webs 17. The central screw 10 is now connected to the lower spider 6 by the lugs 10a and the hand wheel 11 is rotated for bringing the pressure plates 3 and 4 against the tire side walls. The inner tube 9a is now inflated to the desired pressure and the auxiliary plate 12 will exert the proper pressure against the heating pad 18.

During the vulcanizing of the tread and side wall patch, steam is delivered to the steam chamber 1 in the mold and the pad is connected to a source of current. In this way, heat from the matrix and pad will vulcanize both the tread and patch at the same time. The current delivered to the pad can be controlled to effect a proper vulcanization of the patch.

The completely recapped and patched tire may be removed from the mold when the vulcanizing is completed. It should be noted that the auxiliary pressure plate 12 obtains some of its heat by contacting with the heated matrix 2 which in turn is heated by the steam chamber 1. This heat aids the pad 18 in vulcanizing the patch to the tire side wall.

While I have shown only the preferred form of my invention, it should be understood that various changes or modifications may be made within the scope of the appended claims without departing from the spirit of the invention.

I claim:

1. The combination with a tire capping mold including a matrix for the tread and a pressure plate for the side wall of the tire, of an auxiliary pressure plate disposed between the matrix and the first-mentioned pressure plate, said auxiliary pressure plate applying pressure to the tire side wall, and a heating pad placed between the tire and the auxiliary pressure plate.

2. The combination with a tire vulcanizing mold, including a matrix and a spider carrying an annular pressure plate spaced radially inwardly from the matrix, said spider having arms extending radially outwardly beyond the annular pressure plate, of an auxiliary arcuate-shaped pressure plate extending throughout a portion only of a circle and positioned between the matrix and the annular pressure plate for holding a heating pad against the tire side wall, and wedges disposed between the auxiliary pressure plate and the spider to adapt the auxiliary pressure plate to be placed at any desired circumferential position around the tire.

3. In combination, a matrix for receiving the tread of a tire, a spider carrying an annular pressure ring spaced from the matrix, an auxiliary pressure plate lying between the matrix and annular pressure ring and operatively engaging with both, and a heating pad underlying the auxiliary pressure plate and contacting with the tire.

4. The combination with a tire capping mold including a matrix for the tread and a pressure plate for the side wall of the tire, of an auxiliary pressure plate extending under the pressure plate and up to the matrix, and a heating pad placed between the tire and the auxiliary pressure plate.

5. The combination with a tire capping mold including a matrix for the tread, a pressure plate for the side wall of the tire, and a spider carrying the pressure plate and projecting radially therebeyond, of an auxiliary pressure plate lying between the matrix and the first pressure plate, said auxiliary pressure plate being operatively connected to the matrix, the first pressure plate, and the spider, and a heating pad placed between the tire and the auxiliary pressure plate.

6. The combination with a tire capping mold including a matrix for the tread, a pressure plate for the side wall of the tire, and a spider carrying the pressure plate and projecting radially therebeyond, of an auxiliary pressure plate lying between the matrix and the first pressure plate, said auxiliary pressure plate being operatively connected to the matrix, the first pressure plate, and the spider, and a heating pad placed between the tire and the auxiliary pressure plate, the connections between the auxiliary pressure plate and the spider including wedge-shaped members interposed between the spider and the auxiliary pressure plate.

LEO GEORGE OREN.